US008719893B2

(12) United States Patent
Myers et al.

(10) Patent No.: US 8,719,893 B2
(45) Date of Patent: May 6, 2014

(54) SECURE MODULE AND A METHOD FOR PROVIDING A DEDICATED ON-SITE MEDIA SERVICE

(75) Inventors: Rob Myers, Santa Cruz, CA (US); Richter A. Rafey, Santa Clara, CA (US); Klaus Hofrichter, Santa Clara, CA (US); Harold Aaron Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 38 days.

(21) Appl. No.: 13/249,050

(22) Filed: Sep. 29, 2011

(65) Prior Publication Data

US 2012/0079540 A1    Mar. 29, 2012

Related U.S. Application Data

(62) Division of application No. 09/524,770, filed on Mar. 14, 2000, now abandoned.

(60) Provisional application No. 60/124,472, filed on Mar. 15, 1999.

(51) Int. Cl.
*H04N 7/173*     (2011.01)
*H04N 21/433*    (2011.01)
*H04N 21/472*    (2011.01)
*H04N 21/4147*   (2011.01)
*H04N 21/435*    (2011.01)

(52) U.S. Cl.
CPC ..... *H04N 21/4334* (2013.01); *H04N 21/47214* (2013.01); *H04N 21/4147* (2013.01); *H04N 21/435* (2013.01)
USPC ............... 725/134; 725/89; 725/93; 725/115; 725/142

(58) Field of Classification Search
USPC .............................. 725/89, 93, 115, 134, 142
See application file for complete search history.

(56) References Cited

U.S. PATENT DOCUMENTS 5,134,499 A    7/1992  Sata et al.
5,371,551 A   12/1994  Logan et al.
(Continued)

FOREIGN PATENT DOCUMENTS

EP    0676756    10/1995
EP    0726574     8/1996
(Continued)

OTHER PUBLICATIONS

"Automatic Constructions of Personalized TV News Programs", Association of Computing Machinery (ACM) Multimedia Conf., 323-331 (Presented Nov. 3, 1999).
(Continued)

*Primary Examiner* — Jason Salce
(74) *Attorney, Agent, or Firm* — Blakely, Sokoloff, Taylor & Zafman LLP

(57) ABSTRACT

A service module for a dedicated on-site media service. The service module enables a dedicated media service for a broadcast signal. The electronic media module includes a tuner, a media storage device, and an adapter. The tuner, which is coupled to the media storage device, or portion thereof, is tuned to receive a broadcast signal. The media storage device stores this broadcast signal. The adapter is coupled to the media storage device and to the tuner. The adapter further interfaces the tuner and the media storage device of the electronic media module with an electronic media system. A content provider has remote control over the stored content. The content provider also has remote control over on-site presentation of the stored media to the viewer. Multiple dedicated service modules installed on-site allow these functions to be applied across multiple content-providers simultaneously.

20 Claims, 8 Drawing Sheets

CONFIGURATION A: TRADITIONAL

CONFIGURATION B: INTEGRATED

CONFIGURATION C: STACKED

(56) References Cited

U.S. PATENT DOCUMENTS

| | | | |
|---|---|---|---|
| 5,406,626 | A | 4/1995 | Ryan |
| 5,457,746 | A | 10/1995 | Dolphin |
| 5,483,277 | A | 1/1996 | Granger |
| 5,483,278 | A | 1/1996 | Strubbe et al. |
| 5,524,051 | A | 6/1996 | Ryan |
| 5,563,946 | A | 10/1996 | Cooper et al. |
| 5,590,195 | A | 12/1996 | Ryan |
| 5,625,464 | A | 4/1997 | Compoint et al. |
| 5,635,979 | A | 6/1997 | Kostreshi et al. |
| 5,638,443 | A | 6/1997 | Stefik et al. |
| 5,652,613 | A * | 7/1997 | Lazarus et al. ............ 725/50 |
| 5,699,107 | A | 12/1997 | Lawler et al. |
| 5,748,890 | A | 5/1998 | Goldberg et al. |
| 5,751,806 | A | 5/1998 | Ryan |
| 5,758,259 | A | 5/1998 | Lawler |
| 5,786,845 | A | 7/1998 | Tsuria |
| 5,790,177 | A | 8/1998 | Kassatly |
| 5,790,935 | A | 8/1998 | Payton |
| 5,797,010 | A | 8/1998 | Brown |
| 5,798,785 | A | 8/1998 | Hendricks et al. |
| 5,805,763 | A | 9/1998 | Lawler et al. |
| 5,861,881 | A | 1/1999 | Freeman et al. |
| 5,861,906 | A | 1/1999 | Dunn et al. |
| 5,900,905 | A | 5/1999 | Shoff et al. |
| 5,907,321 | A | 5/1999 | Grossman et al. |
| 5,920,700 | A * | 7/1999 | Gordon et al. ............ 709/226 |
| 5,931,908 | A | 8/1999 | Gerba et al. |
| 5,949,954 | A | 9/1999 | Young et al. |
| 5,995,155 | A | 11/1999 | Schindler et al. |
| 6,002,394 | A * | 12/1999 | Schein et al. ............ 725/39 |
| 6,029,046 | A | 2/2000 | Khan et al. |
| 6,078,360 | A | 6/2000 | Doornhein et al. |
| 6,081,533 | A | 6/2000 | Laubach et al. |
| 6,160,570 | A | 12/2000 | Sitnik |
| 6,173,406 | B1 | 1/2001 | Wang et al. |
| 6,175,925 | B1 | 1/2001 | Nardone et al. |
| 6,177,931 | B1 | 1/2001 | Alexander et al. |
| 6,178,509 | B1 | 1/2001 | Nardone et al. |
| 6,182,050 | B1 | 1/2001 | Ballard |
| 6,205,550 | B1 | 3/2001 | Nardone et al. |
| 6,215,526 | B1 | 4/2001 | Barton et al. |
| 6,226,444 | B1 | 5/2001 | Goldschmidt et al. |
| 6,233,389 | B1 | 5/2001 | Barton et al. |
| 6,236,395 | B1 | 5/2001 | Sezan et al. |
| 6,237,786 | B1 | 5/2001 | Ginter et al. |
| 6,253,193 | B1 | 6/2001 | Ginter et al. |
| 6,264,560 | B1 | 7/2001 | Goldberg et al. |
| 6,304,714 | B1 | 10/2001 | Krause et al. |
| 6,310,886 | B1 | 10/2001 | Barton |
| 6,327,418 | B1 | 12/2001 | Barton |
| 6,338,139 | B1 | 1/2002 | Ando et al. |
| 6,359,636 | B1 | 3/2002 | Schindler et al. |
| 6,377,861 | B1 | 4/2002 | York |
| 6,385,739 | B1 | 5/2002 | Barton et al. |
| 6,416,714 | B1 | 7/2002 | Nova et al. |
| 6,434,535 | B1 | 8/2002 | Kupka et al. |
| 6,434,747 | B1 | 8/2002 | Khoo et al. |
| 6,468,160 | B2 | 10/2002 | Eliott |
| 6,476,825 | B1 | 11/2002 | Croy et al. |
| 6,487,646 | B1 | 11/2002 | Adams et al. |
| 6,490,722 | B1 | 12/2002 | Barton et al. |
| 6,493,878 | B1 | 12/2002 | Kassatly |
| 6,498,895 | B2 | 12/2002 | Young et al. |
| 6,512,837 | B1 | 1/2003 | Ahmed |
| 6,516,467 | B1 | 2/2003 | Schindler et al. |
| 6,519,571 | B1 | 2/2003 | Guheen et al. |
| 6,535,253 | B2 | 3/2003 | Barton et al. |
| 6,611,607 | B1 | 8/2003 | Davis et al. |
| 6,614,987 | B1 * | 9/2003 | Ismail et al. ............ 386/291 |
| 6,625,295 | B1 | 9/2003 | Wolfgang et al. |
| 6,628,344 | B1 | 9/2003 | Weber |
| 6,636,273 | B1 | 10/2003 | Weber |
| 6,640,145 | B2 | 10/2003 | Hoffberg et al. |
| 6,642,939 | B1 | 11/2003 | Vallone et al. |
| 6,643,798 | B2 | 11/2003 | Barton et al. |
| 6,678,389 | B1 | 1/2004 | Sun et al. |
| 6,697,948 | B1 | 2/2004 | Rabin et al. |
| 6,714,683 | B1 | 3/2004 | Tian et al. |
| 6,728,713 | B1 | 4/2004 | Beach et al. |
| 6,748,080 | B2 | 6/2004 | Russ et al. |
| 6,757,837 | B1 | 6/2004 | Platt et al. |
| 6,757,906 | B1 | 6/2004 | Look et al. |
| 6,848,002 | B1 | 1/2005 | Detlef |
| 6,865,550 | B1 | 3/2005 | Cok |
| 7,058,414 | B1 | 6/2006 | Rofheart et al. |
| 7,123,813 | B2 | 10/2006 | Inoue |
| 7,231,669 | B2 | 6/2007 | Leung et al. |
| 7,359,883 | B2 | 4/2008 | Namba et al. |
| 7,546,627 | B2 | 6/2009 | Kawai |
| 2001/0018742 | A1 | 8/2001 | Hiraiq |
| 2001/0019658 | A1 * | 9/2001 | Barton et al. ............ 386/46 |
| 2002/0040439 | A1 | 4/2002 | Kellum |
| 2002/0040475 | A1 | 4/2002 | Yap et al. |
| 2002/0059614 | A1 | 5/2002 | Lipsanen et al. |
| 2002/0083157 | A1 | 6/2002 | Sekiguschi et al. |
| 2002/0138761 | A1 | 9/2002 | Kanemark et al. |
| 2002/0170068 | A1 | 11/2002 | Rafey et al. |
| 2003/0088872 | A1 | 5/2003 | Maissel et al. |
| 2003/0126432 | A1 | 7/2003 | Tonisson |
| 2003/0149988 | A1 | 8/2003 | Ellis et al. |
| 2003/0154390 | A1 | 8/2003 | Yamauchi et al. |
| 2003/0174861 | A1 | 9/2003 | Levy et al. |
| 2003/0219127 | A1 | 11/2003 | Russ et al. |
| 2003/0221100 | A1 | 11/2003 | Russ et al. |
| 2004/0083377 | A1 | 4/2004 | Wu et al. |
| 2004/0107368 | A1 | 6/2004 | Colvin et al. |
| 2004/0117320 | A1 | 6/2004 | Morioka et al. |
| 2004/0117663 | A1 | 6/2004 | Colvin |
| 2004/0177369 | A1 | 9/2004 | Akins |

FOREIGN PATENT DOCUMENTS

| EP | 0862/328 | 9/1998 |
| WO | WO 80/02093 | 10/1980 |
| WO | WO 94/13107 | 6/1994 |
| WO | WO 97/41690 | 11/1997 |

OTHER PUBLICATIONS

"The Wave Report", Feb. 12, 1999, 2 pages, http://www.wave-report.com/1999_Wave_Issues/wave9016.html.

"TiVo brings home HBO through agreement benefiting personal television service users" Press Release, "Online!" Jan. 28, 1999, XP002154115, Retrieved from the Internet: <URL:www.tivo.com?, retrieved on Nov. 29, 2000.

"Metabyte Announces Personalized TV Software", Press Release, "Online!", Jan. 21, 1999, XP002154116, Retrieved from the Internet; URLURL:www.mbtv.com.

* cited by examiner

Prior Art Fig. 1

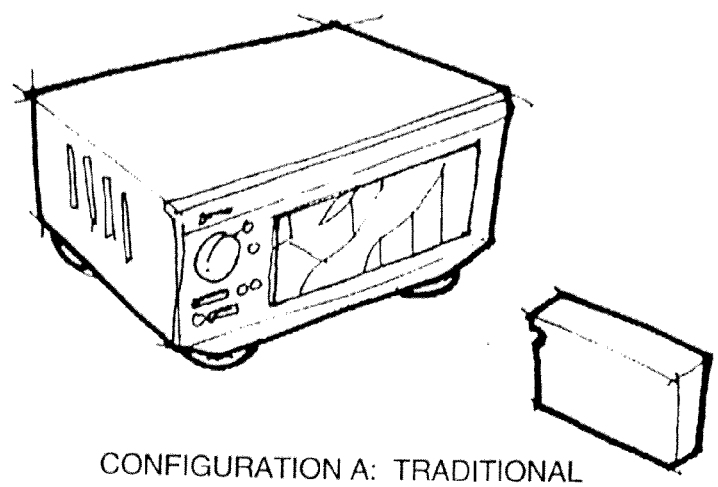
CONFIGURATION A: TRADITIONAL
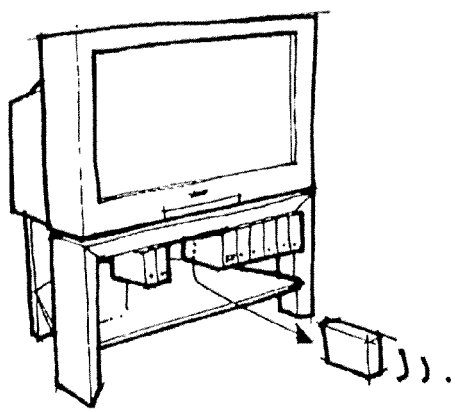
CONFIGURATION B: INTEGRATED
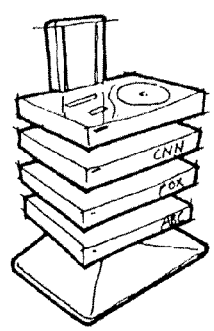
CONFIGURATION C: STACKED
Fig. 3B

SECURE MODULE AND A METHOD FOR PROVIDING A DEDICATED ON-SITE MEDIA SERVICE

RELATED APPLICATIONS

This is a divisional of U.S. patent application Ser. No. 09/524,770, entitled "A Service Module And A Method For Providing A Dedicated On-Site Media Service" filed on Mar. 14, 2000 now abandoned and claims the benefit of priority of prior provisional application Ser. No. 60/124,472, filed Mar. 15, 1999.

TECHNICAL FIELD

The field of the present invention pertains to a method and device for presenting a dedicated on-site media service. More particularly, the present invention relates to the field of delivering and remotely managing a dedicated on-site media service, such as television programming, customer services, or customer interfaces (e.g., shopping), and the present invention relates to the field of media devices that can implement this on-site media service.

BACKGROUND ART

Conventional television (TV) media presentation models have significant weaknesses on both the content-provider (e.g., broadcaster) side of the model and on the viewer side of the model. In particular, the prior art media presentation model gives the content-provider very little control over how the viewer can record and watch a given broadcast. On the other end, the prior art media presentation model gives the viewer essentially no interactive services or features. These limitations generate subsequent needs, as described hereinafter.

Conventional program broadcasters provide a linear content paradigm. Conventional broadcasters, such as NBC, CBS, and ABC, provide programs with commercials to compensate for production and delivery costs. Alternative broadcasters provide movie or news channels, via cable or satellite, with mostly-commercial free programming, but requiring a subscription fee. However, both of these program scenarios provide only one broadcast model, and this model is linear. Given the increasing demands and diversification of the viewer class, a need arises for overcoming the limitation of the linear content paradigm in conventional broadcasting.

Furthermore, broadcasters typically provide a linear presentation style. That is, the content provider edits the raw media prior to broadcast into a linear, single-option presentation provided at predetermined time intervals. The prior art broadcast paradigm is a monolithic, air-time oriented broadcast. Because of the limited presentation styles of current broadcasters, a need arises for a method of providing a media presentation without the rigid limitations of a single and linear presentation style.

Similarly, conventional broadcasting provides essentially no services or functions with the broadcast media. Rather, broadcasting services offer only content data, such as audio/visual (A/V) data. Consequently, a need arises for overcoming the limitations of content-only broadcasting in order to provide greater utility to the viewer.

Conventional media devices are constantly replaced with new features and capabilities. For example, Video Cassette Recorders (VCRs) provide local, e.g., in-home, ability to record media broadcasts. More recently, the introduction of Digital Video Discs (DVDs) and hard drive recording systems has increased the quantity of media that can be recorded and viewed. However, with the increased sophistication of technology, media systems often become too technically sophisticated for many users. Consequently, a need arises for a method to make a media service more user friendly.

Conventionally, the function and services provided by prior art media devices are limited by the types and amount of data input they receive. In other words, the limitations in broadcasting content and format propagate down to effectively generate limitations in the viewer's display and recording devices. Thus, the device or method that performs the media services and functions for the user must be extensible.

Another problem facing modern broadcasting paradigms is the increased control that viewers have with viewing some portions of the broadcast programs. That is, media content providers, e.g. broadcasters, often lack control over their business plan's goal of providing exposure for a program's sponsor. Home video recording devices are a prime cause for this situation. By recording programs, and by using the advertisement-skipping feature offered by some systems, the program's sponsor fails to achieve their desired exposure necessary to offset their sponsorship expenses. Consequently, a need arises for a method of ensuring sponsorship exposure. However, even if a sponsor receives exposure, a need still arises to match a sponsor or a product with an intended market audience. Hence, a need arises for a method to provide a content provider with some control over what media content the user can view.

Because of the limited broadcast paradigms, a viewer has limited control over the viewing experience other than changing a channel, or replaying the predetermined broadcast format from a video recorder. Given the strong demands of modern viewers for more information and options, an opportunity arises for a method and device that allows a viewer to exercise more choice over a media presentation within the constraints of a content-provider's business plan.

Many limitations arise due to the narrow application-specific design of media devices and due to the narrow and rigid paradigm of broadcasting media. Several specific problems are presented below to more clearly illustrate the limitations of the conventional media broadcast system.

The limitation in services offered to the viewer is illustrated by prior art FIG. 1. In prior art FIG. 1, a diagram of data recorded on a conventional hard drive recorder 100 is shown. Conventional hard drive recorder 100 is shown with several television programs recorded thereon, e.g. program A 102a, program B 102b, program D 102d, and program C 102c. Conventional broadcasts may provide information about the program being viewed or recorded. However, this information typically is very large grained, and offers only limited data at large time intervals. For example, conventional information provided about a broadcast program may include: the start and stop times of a program; the length of the program; a rating grade; and a very short statement about the subject of the program. However, with such limited information, it becomes very labor intensive for a user to locate a desired portion of a program. Hence, a need arises for providing increased functionality in a media presentation provided to a viewer. More specifically, a need arises for a method to improve the ability of a user to locate a specific segment of information within a broadcast program.

Once a viewer's recording system has obtained the desired media content, it becomes the task of the viewer to personally manage the recorded data. Some of the management issues that arise include: deciding whether a program has information worth recording, detecting which programs have been viewed, deciding which programs to overwrite, and deciding which programs to update. For example, once a given recording device is filled to capacity, the prior art systems require the user to decide what portions of the recorded programs can be overwritten. At best, this task can become burdensome and time-consuming. Hence, a need arises for providing increased service in a media presentation provided to a viewer. More particularly, a need arises for a device and a method that removes from the viewer the management burdens of viewing and updating recorded programs.

A viewer has essentially three options for media presentation. With the first option, the viewer watches the media presentation, e.g. the television (TV) program, at the broadcaster provided times and dates. In the second option, the viewer records the programs, and deals with the associated service and functional limitations of recording. Either way, the media presentation is very narrow and limited. A third method for a media presentation is for the viewer to manually search in a database for the presentation content desired. This method has an undesirable latency required for the search and for acquiring the content. For example, if the viewer creates a presentation from news clips on an Internet news provider, s/he must to format a search, or select an icon, that will retrieve the desired information from a server or cache. This consumes time and effort of the viewer. Consequently, a need arises for a media presentation system that overcomes the limitations of conventional viewer-driven media paradigms.

SUMMARY OF THE INVENTION

The present invention provides a method and apparatus for an on-site dedicated media service that overcomes the limitation of the linear content-only model of conventional broadcasting and of subsequent conventional presentation to the viewer. The present invention provides a method where the content provider transmits some of the raw non-linear media content, along with service data, downstream to an on-site media system having a dedicated service module where it will generate a media presentation with optional user interaction.

More specifically, the present invention implements the dedicated media service on an on-site media system, e.g., in a viewer's home, that is much more user friendly than conventional devices. That is, the present invention provides a dedicated service module that is a self-contained autonomous "plug and play" device managed remotely by the content provider as an intrinsic part of the service. Furthermore, the present invention provides a flexible media device that can implement new features without having to replace the device. That is, the presentation system can be re-programmed by a content-provider using the present invention.

The present invention also provides collateral benefits. For example, the present invention ensures sponsorship exposure by providing a dedicated media service that more accurately matches advertisements with the viewer. The present invention also provides a media device that provides the viewer with more options and interactions with the media presentation they desire to view.

Additionally, the present invention improves the ability of a viewer to locate a specific segment of information in a recorded broadcast program. The present invention also provides a media device that is simpler to use and that uses viewers' time more efficiently. The present invention accomplishes this goal by removing the media storage management burdens from the viewer and by performing the storage management tasks by the content provider remotely. The present invention provides a media presentation system that overcomes the limitations of conventional broadcast paradigms and of alternative media sources, such as the Internet.

Specifically, one embodiment of the present invention provides an on-site media system referred to as a dedicated service module. The dedicated service module includes a dedicated tuner coupled to a dedicated media storage device, or portion thereof, that are both dedicated for a single content provider, e.g. a specific content provider's transmission frequency. The specific content provider has the ability to select the content that is recorded onto the dedicated storage device and can also control the manner in which the stored content can be presented to the viewer. The dedicated service module can also include a processor and memory that act as an on-site software platform to interface a content provider (e.g., a broadcaster or Internet provider) with a content presenter (on-site presentation engine) and with input from a viewer. In particular, platform software can be provided to the on-site media system that allows it to implement the on-site media service data, commands, and software transmitted from the content provider to the on-site media system with the dedicated service module. The dedicated service module can allow for proprietary encoding of service information in a datacast associated with broadcast streams. The dedicated service module can also support software reconfiguration via broadcast at several different levels (e.g., device upgrade, software platform upgrade, and content upgrade).

The dedicated service module provides win-win benefits for both the content provider and the viewer. For example, the dedicated service module gives the content provider the desired control over the on-site media presentation, e.g. content and audience, by using a dedicated tuner that provides a dedicated path for the broadcast stream, regardless of the user's other viewing patterns. That is, the dedicated tuner of the present invention is always tuned to the given broadcast stream, even if the viewer is watching a different broadcast stream on the television. The dedicated service module also provides the content provider with the desired control over the on-site media presentation by using a dedicated media storage device providing guaranteed capacity and support for the desired number of media streams, e.g. input and output. Thus, the content provider benefits by a guaranteed delivery system with reliable quality of service in an efficient, non-competing resource model.

At the same time, the dedicated service module of the present invention also provides many benefits to the viewer. For example, the dedicated service module provides the viewer with content options, service options, and function options that can be interactively and easily implemented. Notably, the content-provider can exercise editorial control over when and what service, function, and content options are available to the viewer. This allows greater choice to a viewer while still satisfying a business model for the content provider. Furthermore, the dedicated service module is very flexible, expandable, and effective with respect to the user, thus enhancing its value and utility. Hence, the present invention provides significant and radical improvements over conventional viewing and recording devices and models.

In one embodiment, the present invention includes a method that provides enhanced on-site media service, enabled through a dedicated consumer electronics device, e.g. the dedicated service module. The first step of the method provides an on-site media system, e.g. the dedicated service module, with software that allows the on-site software platform to enable the content provider to manage the content on the on-site presentation engine and to support viewer interaction. In one embodiment, the on-site software platform allows the content provider to manage the on-site presentation engine remotely.

In the next step of the process, a media signal, also referred to as a broadcast signal, is formatted with content data and with on-site media service data. The on-site media service data includes information that provides the media system with interactive options, data that controls the on-site media service according to the parameters desired by a content provider, and data that provide functions and services to the viewer. The on-site media service data can be a command, a software code, or a description. In the next step, the media signal is provided to the on-site media system. The media system receiving the media signal is the dedicated service module, having a dedicated tuning device, dedicated recording device, and an on-site software platform for interfacing the content provider with the content presenter and with input from a viewer. The media signal thus enables the on-site media system to provide an interactive, user-friendly on-site media presentation under content provider control. By providing content data and on-site media service data to an on-site interactive media system that can implement it, the present invention effectively bestows desired benefits to both the content provider and to the viewer.

As an example that implements the device and/or the method above, a content provider may broadcast news stories throughout the day, along with tagged on-site media service data, to an on-site media system. Because the content provider has control over all aspects of the on-site media management, the content provider can instruct the dedicated media storage device to record all or some portions of the news stories it has broadcast, subject to viewer selected options, along with their tagged on-site media service data. When the viewer arrives on-site, s/he can command the retrieval of the day's news stories at their convenience, along with viewer-selected options for presentation. Furthermore, the viewer can implement other features or services such as navigation, archiving, or segment-skipping of the recorded programs. Thus, the on-site media service feels like video on demand, without the contemporary limitations of cumulative impacts on a centralized server. The broadcast is stored and presented on-site in the present invention, essentially making the service a very interactive, real-time presentation. In conclusion, the dedicated service module and broadcast method integrates services, content, and device functions and options to the benefit of both content provider and viewer.

These and other advantages of the present invention will become clear to those of ordinary skill in the art after having read the following detailed description of the preferred embodiments which are described herein.

BRIEF DESCRIPTION OF THE DRAWINGS

The accompanying drawings, which are incorporated in, and form a part of, this specification, illustrate embodiments of the invention and, together with the description, serve to explain the principles of the invention. The drawings referred to in this description should be understood as not being drawn to scale except as specifically noted.

PRIOR ART

FIG. 3B is a diagram of multiple designs of a dedicated service module, in accordance with one embodiment of the present invention.

BEST MODE FOR CARRYING OUT THE INVENTION

Figure 1:
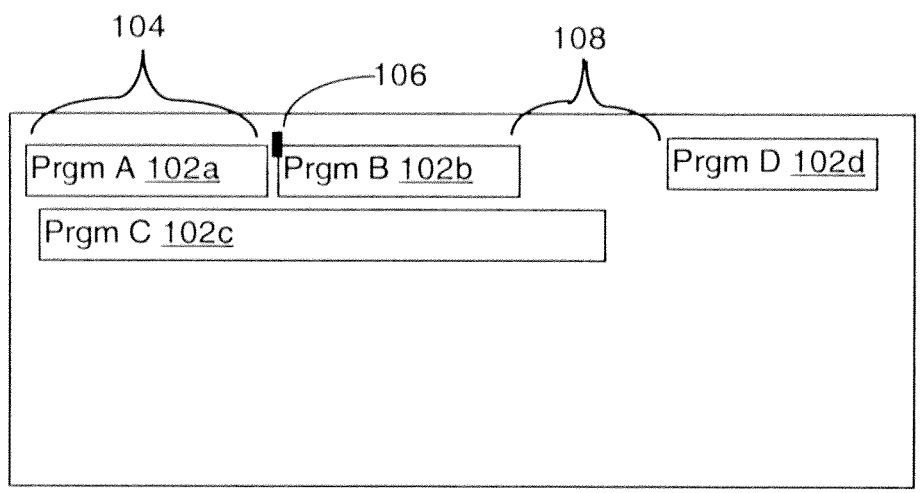
FIG. 1 is a diagram of data recorded on a conventional media-recording device.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g. the processes, are presented in terms of procedures, logic blocks, processing, and other symbolic representations of operations on data bits within a computer or a digital system memory. These descriptions and representations are the means used by those skilled in the arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "formatting," "broadcasting," "receiving," "presenting, or the like, refer to the action and processes that can be implemented by an electronic device, that manipulates and transforms data. The data is represented as physical (electronic) quantities within components of the device, and is transformed into other data similarly represented as physical quantities within the device components, or computer system memories or registers, or other such information storage, transmission or display devices.

Figure 2:
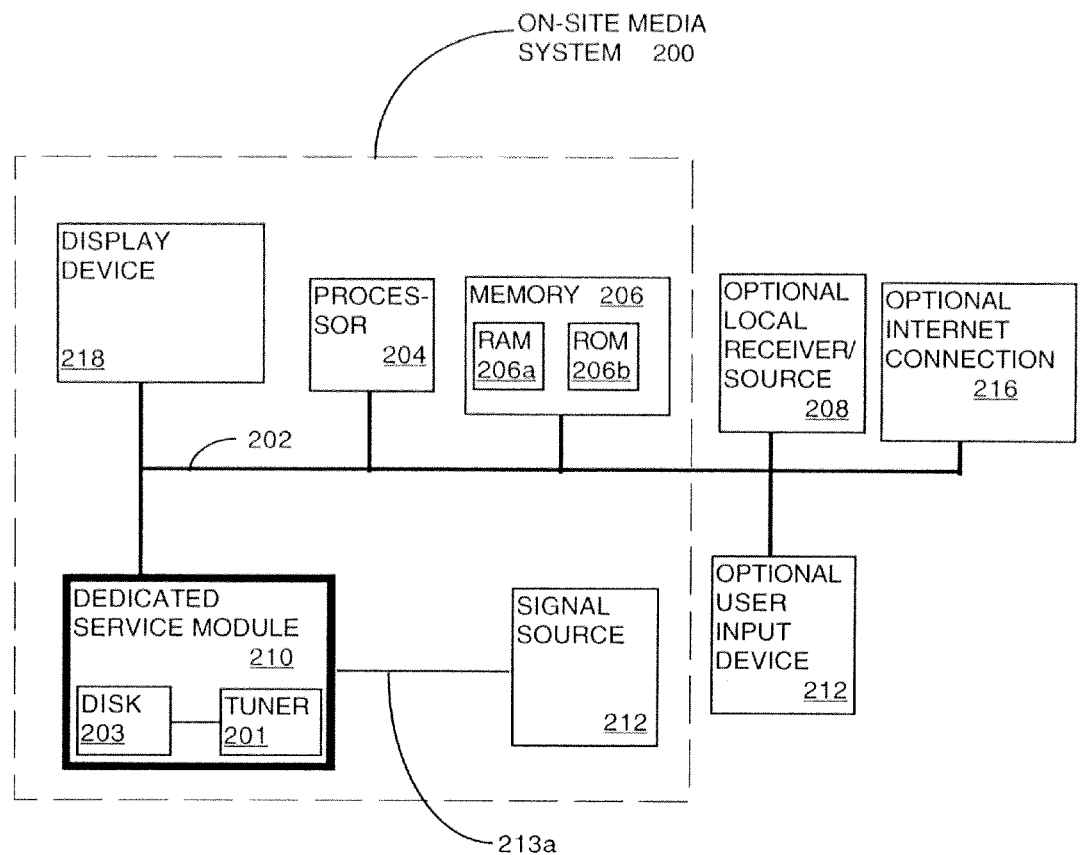
FIG. 2 is a block diagram of an on-site media system having a dedicated service module, in accordance with one embodiment of the present invention.

Referring now to FIG. 2, a block diagram of an on-site media system having a dedicated service module is shown, in accordance with one embodiment of the present invention. To provide a context for the dedicated service module, on-site media system 200 shows one embodiment of a larger system in which the dedicated service module may be implemented to provide a dedicated on-site media service. On-site media system 200 includes a control/data bus 202 for communicating information, a central processor unit 204 for processing information and instructions, coupled to bus 202, and a memory unit 206 for storing information and instructions, coupled to bus 202. Memory unit 206 can include random access memory (RAM) 206a, for storing temporal information and instructions for central processor unit 204, and read only memory (ROM) 206b, for storing static information and instructions for central processor unit 204. System 200 also includes a display device 218 coupled to bus 202, for viewing data, and a signal source 212, coupled to dedicated service module 210 via line 213a for providing a signal.

On-site media system 200 also includes a dedicated service module 210, coupled to bus 202, to provide a media signal. Dedicated service module 210 can also be referred to as a dedicated media device or a dedicated service cartridge, depending on its specific configuration. Dedicated service module 210, enables the on-site media service to be implemented by providing dedicated tuning and guaranteed storage for a broadcast signal. The dedicated tuning provides a dedicated path from the broadcast stream into the guaranteed storage device. More specifically, dedicated service module 210 includes one or more dedicated tuners and one or more dedicated media storage devices, coupled to each other. More details of dedicated service module 210 are provided in subsequent figures. Dedicated service module 210 can allow for proprietary encoding of service information in datacast associated with broadcast streams with built-in support in the dedicated service module for processing the service information. The dedicated service module can also support software reconfiguration via broadcast at several different levels (e.g., device upgrade, software platform upgrade, and content upgrade).

Signal source 212 can be any device, such as an antennae for receiving a broadcast, a cable interface for line transmission, or a dish for receiving satellite broadcast. Display device 218 of FIG. 2 can be any type of display, including an analog or a digital television, or a personal computer (PC) display. While processor 204 and memory 206 are shown as individual entities, they may be incorporated into another component. For example, processor 204 and memory 206 may be new components or may be existing components in display device 218, e.g. a digital television (DTV), dedicated service module 210, or in a set-top box (not shown). Additionally, while dedicated service module 210 is shown individually, it may be integrated into other components, such as display device 218, as shown in configuration B of subsequent FIG. 3B.

System 200 also includes an optional Internet connection 216 coupled to bus 202 for transmitting information to, and receiving information from, the Internet. An optional user input device 212, e.g. a keypad, remote control, etc., coupled to bus 202 is also included in system 200 of FIG. 2, to provide communication between system 200 and a user. Optional local receiver/source 208, which can be a set top box in one embodiment, is coupled to bus 202 to provide a media signal. Optional local receiver/source 208 can alternatively be located inside display device 218. Optional local receiver/source 208 can allow viewer options such as simultaneous viewing of a program through a tuner or source that is independent of the dedicated tuners of dedicated service module 210. Thus, the dedicated tuner, e.g. 201, in dedicated service module 210, always provides a dedicated path for a given media signal.

Bus 202 provides an exemplary coupling configuration of devices in on-site media system 200. Bus 202 is shown as a single bus line for clarity. It is appreciated by those skilled in the art that bus 202 can include subcomponents of specific data lines and/or control lines for the communication of commands and data between appropriate devices. It is further appreciated by those skilled in the art that bus 202 can be a parallel configuration, a serial configuration, or a "firewire" (IEEE 1394) configuration, and that bus 202 can include numerous gateways, interconnects, and translators, as appropriate for a given application.

It is also appreciated that on-site media system 200 is exemplary only and that the present invention can operate within a number of different media systems including a commercial media system, a general purpose computer system, etc. Furthermore, the present invention is well-suited to using a host of intelligent devices that have similar components as exemplary on-site media system 200.

Figure 3A:
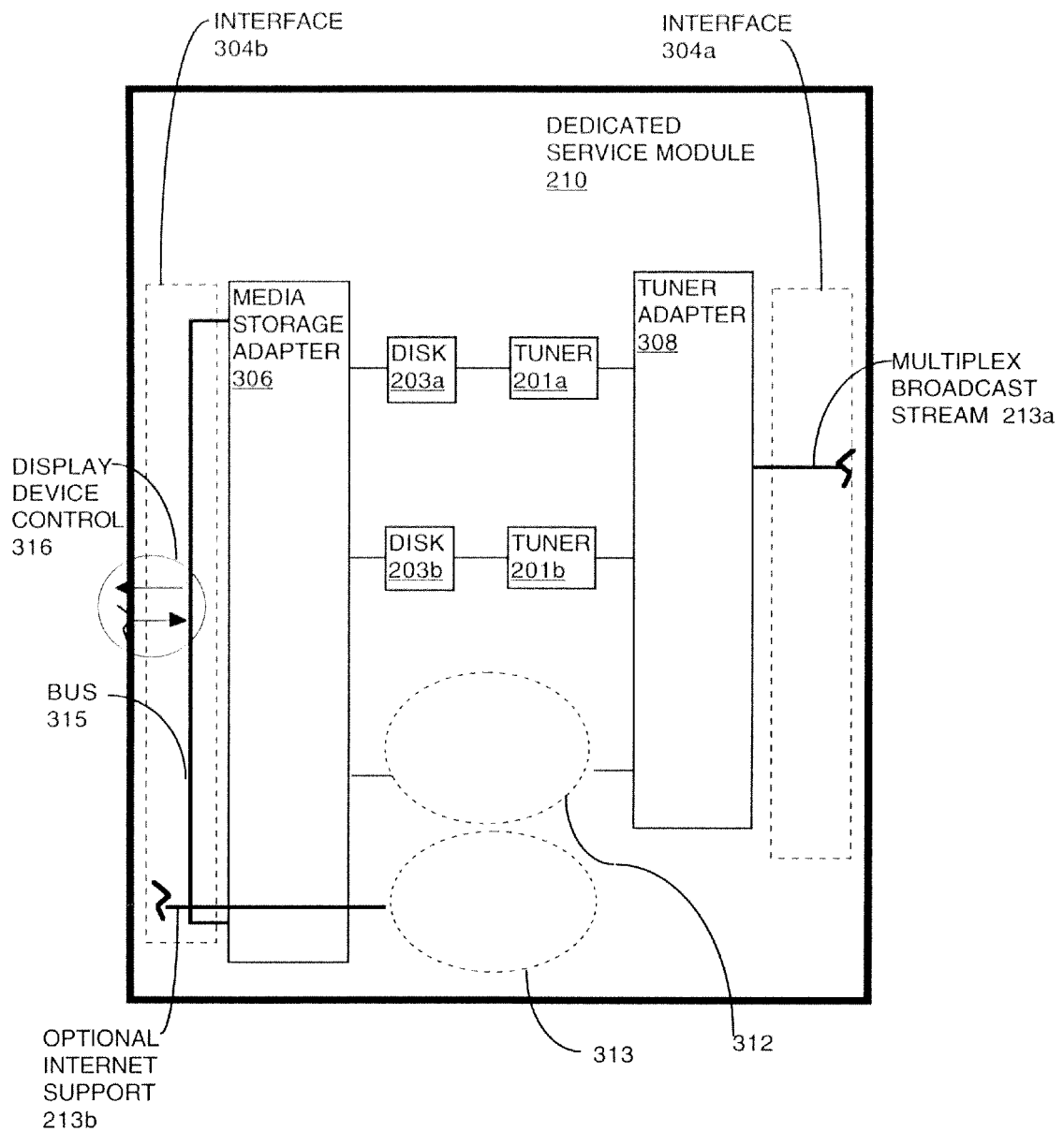
FIG. 3A is a block diagram of data recorded on a dedicated service module, in accordance with one embodiment of the present invention.

Referring now to FIG. 3A, a block diagram of a dedicated service module is shown, in accordance with one embodiment of the present invention. Dedicated service module 210, also referred to as a dedicated media device, or a dedicated service cartridge depending upon the configuration, includes a media storage adapter 306, a tuner adapter 308, and interfaces 304a and 304b for tuner adapter 308 and for media storage adapter 306, respectively. Media storage adapter 306 includes appropriate mechanical and electrical components to accommodate a dedicated media storage device. Similarly, tuner adapter 308 includes appropriate mechanical and electrical components to accommodate a dedicated tuner. Media storage adapter 306 is coupled to tuner adapter 308 via one or more dedicated tuners, e.g. tuner 201a, and one or more dedicated disks, e.g. 203a, respectively coupled together in exclusive pairs, in the present embodiment.

Interface 304a, in turn includes a multiplexed broadcast stream 213a coupled to tuner adapter 308. Interface 304b includes a two-way display device control line 316, which can be coupled to media storage adapter 306 via bus 315. In one embodiment, bus 315 can be coupled to bus 202 of FIG. 2. Interface 304b also includes an optional Internet connection 213b that may be directly coupled to one or more dedicated cartridges, e.g. open slot 313, in one embodiment. In another embodiment, only a dedicated storage device is coupled to optional Internet connection 213b because the Internet connection bypasses the need for a dedicated tuner.

The present embodiment of dedicated service module 210 includes multiple tuners and disks, exclusively coupled to each other as shown. However, the present invention is well-suited to many different configurations. For example, one or more allocated partitions, or portions, of a single disk can be utilized in lieu of separate storage devices, e.g. one hard drive with five partitions replaces five separate hard drives. In yet another embodiment, a "gang" of multiple tuners could be cooperatively shared across a current active receiver, under the assumption that not all of the multiple broadcast signals would want to be tuned and recorded at all times. In this latter embodiment, each broadcast signal can still have a guaranteed capacity of disk storage. This latter embodiment would trade off the cost of a service module with the level of dedicated service desired.

While the present embodiment arranges multiple tuner-storage pairs, e.g. 203a and 201a pair and 203b and 201b pair, in a parallel manner, the present invention is well-suited to alternative coupling arrangements. For example, in one embodiment, tuner-storage pairs may be daisy-chained to deliver the multiplex broadcast signal to each dedicated tuner.

Bus 315, for providing multiplexed broadcast stream, is conformal to the Institute of Electrical and Electronic Engineers (IEEE) 1394 standard in one embodiment. Furthermore, two-way media/data line 316 is also compatible with the IEEE 1394 standard, in one embodiment.

The connection to the optional local receiver, e.g. optional local receiver/source 208 of FIG. 2 (viz., a tuner in a television or Set Top Box (STB)), enables a viewer to access programming from dedicated service module 210 as a set of streams to complement a conventional broadcast from optional local receiver. Furthermore, the present invention is well-suited to using many different configurations of dedicated tuner-storage devices. For example, one or more dedicated media storage devices may be committed to a single dedicated tuner, thus allowing concurrent recording and viewing. Alternative embodiments are provided in subsequent figures.

The present invention also shows one open slot 312 for an additional dedicated tuner-storage pair. However, the present invention is well-suited to providing interactive media device 210 with any number of open slots and any number of installed dedicated tuner-storage pairs.

Additionally, dedicated media storage device 210 has a modular interface to media storage adapter 306 and tuner adapter 308 in the present embodiment. That is, the present embodiment of FIG. 3A is a form-factor media tower into which a consumer can plug or unplug dedicated service cartridges, having the dedicated tuners and media storage devices, corresponding to a desired broadcast service. However, the present invention is well-suited to using an integrated fixed system, e.g. non-modular built-in units.

Referring now to FIG. 3B, multiple designs of a dedicated service module are shown, in accordance with one embodiment of the present invention. Configurations A-C show alternative configurations for a modular embodiment of the dedicated service module, e.g. where the dedicated tuner-disk pairs are removable cartridges. Configuration A shows a traditional stand alone dedicated service module device. Configuration B shows an integrated dedicated service module that is built-in to a display device. Lastly, configuration C shows a stacked stand alone dedicated service module device. The dedicated tuner-storage pairs can be plugged into a backplane of any device appropriate for consumer use. The present invention is well-suited to using any other stacking and coupling configuration for a modular dedicated service module. It is appreciated that the integrated service module devices shown in FIG. 3B are exemplary. The present invention is well-suited to a wide range of designs and configurations for the dedicated service module and the cartridge embodiment of the dedicated tuner-disk pair.

Figure 4:
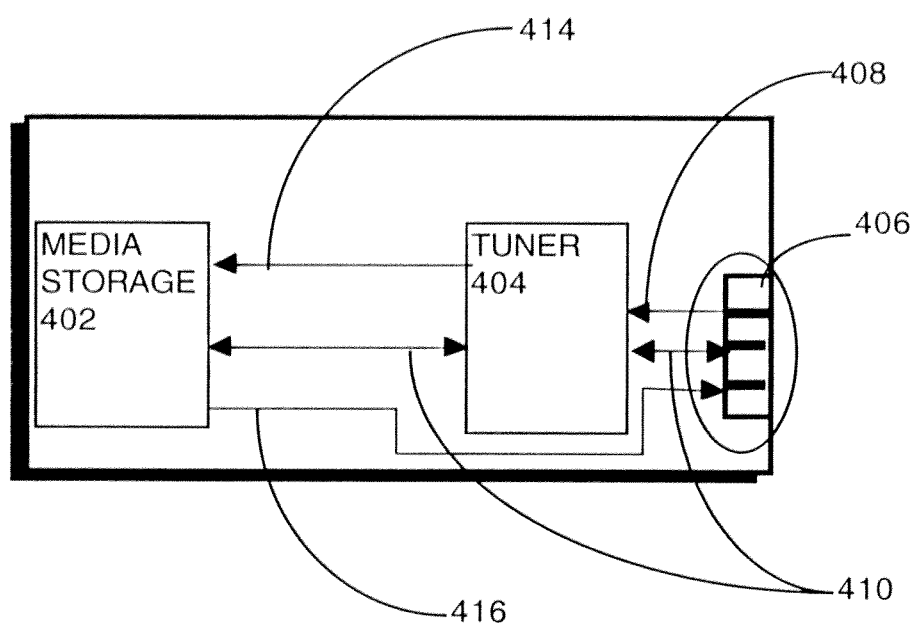
FIG. 4 is a block diagram of another configuration of a dedicated service module, in accordance with one embodiment of the present invention.

Referring now to FIG. 4, a block diagram of another configuration of a dedicated service module is shown, in accordance with one embodiment of the present invention. Dedicated service module 310a, also referred to as a dedicated service cartridge, includes a media storage device 402, and a tuner 404. In the present embodiment, both the media storage device 402 and the tuner 404 to which it is coupled, are dedicated to a specific content provider. For example, tuner 404 may be preset to receive a broadcast frequency corresponding to a national news broadcaster. In another embodiment, dedicated service module 310a can be a generic cartridge that is programmed with tuning instructions suitable to tune in the appropriate broadcast signal, in response to a subscription, or to some other business model.

Tuner 404 of FIG. 4 is coupled to adapter 406 via data line 408 to receive source signal, e.g. a broadcast spectrum. Media storage device 402 and tuner 404 are coupled via control line 410 to adapter 406 to receive instructions to tuner and/or media storage device in accordance with on-site media service software and commands, e.g. via processor 204 and memory 206 of FIG. 2. Media storage device 402 is also coupled to adapter 406 via line 416 to provide media data from media storage device to a media system, such as that shown in FIG. 2. Line 414 provides the dedicated media signal, tuned by tuner 404, to dedicated media storage 402. In another embodiment, data and control can be multiplexed on a single line. Adapter 406 allows dedicated service module 310a to interface with an interactive media system, such as the embodiment shown in FIG. 3A. As mentioned in FIG. 3A, another embodiment of a dedicated service module allows for dedicated Internet access, and thus eliminates the dedicated tuner but retains the dedicated media storage device.

In one embodiment, dedicated service module 310a of FIG. 4 is a modular unit that a consumer can purchase and simply insert to an interactive media system. Media storage device 402 is shown as a single device in FIG. 4. However, the present invention is well-suited to using many different configurations and embodiments. In another embodiment, multiple independent read/write access mechanisms can be adapted to a single recording disk for simultaneous read/write aspects. In the present embodiment, media storage device 402 is a hard drive unit, similar to those used in PCs. However, the present invention is well-suited to using any media recording device, as is appropriate for a given application. Additionally, the tuners and disks of the dedicated service module are capable of recording and delivering a fixed number of streams, e.g. for input and output, as appropriate for the service.

While FIG. 4 provides dedicated tuner-storage device 310a as a removable modular embodiment, it can also be configured as a fixed internal device for incorporation into a display device, such as a digital television. Additionally, tuner 404 can be implemented as a digital or an analog device. While FIG. 4 shows a single media storage device allocated to a single dedicated tuner, the present invention is well-suited to different configurations. For example, in lieu of dedicating an entire media storage device to a single dedicated tuner, one embodiment of the present invention dedicates one or more partitions of a common media storage device to a single dedicated tuner. In this manner, the single common storage device can be shared among multiple tuners while still satiating the goal of guaranteed storage capacity for a broadcast signal.

Figure 5:
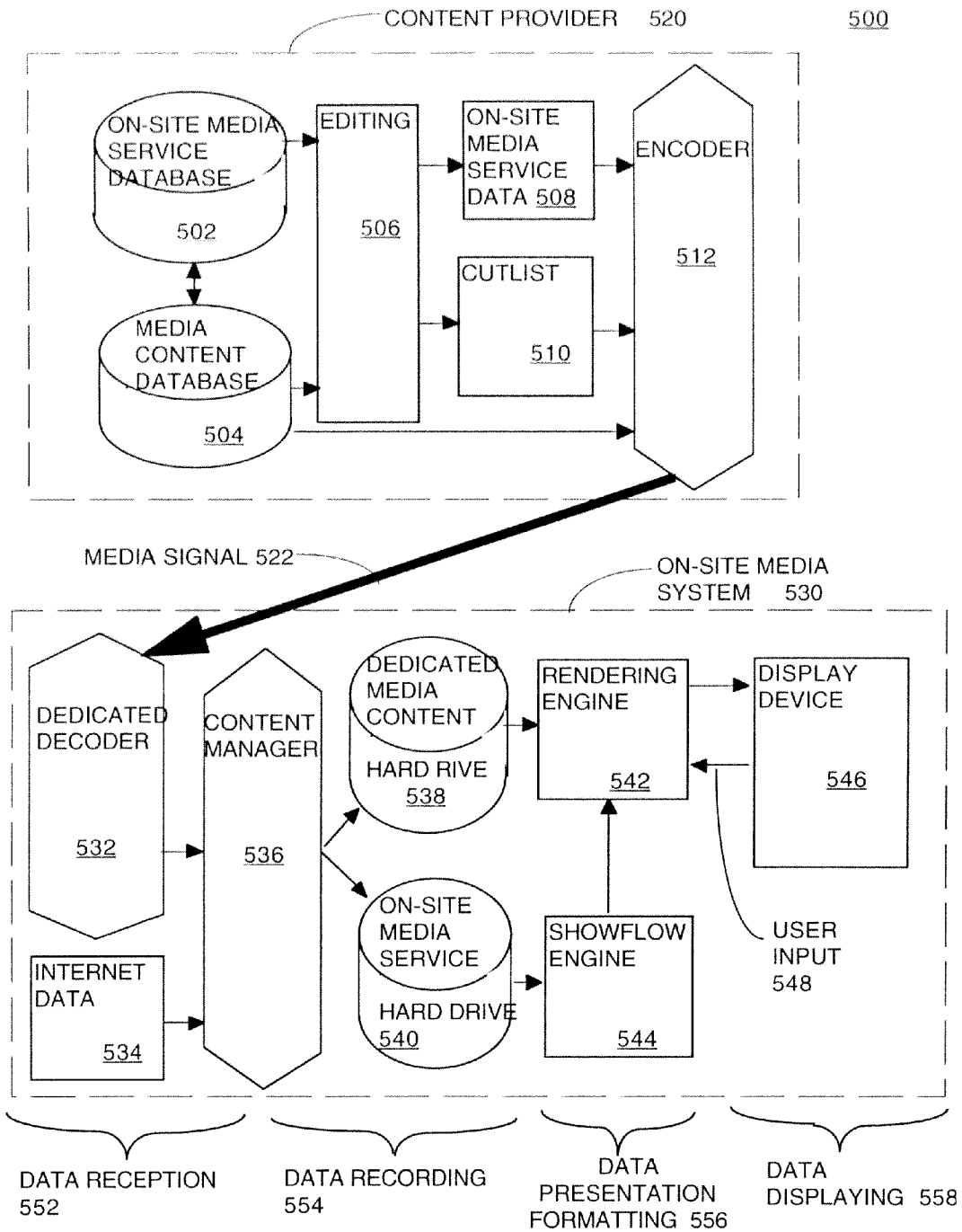
FIG. 5 is a functional block diagram of an interactive media system including content provider and viewer systems with functions, in accordance with one embodiment of the present invention.

Referring now to FIG. 5, a functional block diagram of an interactive media system including content provider media system and on-site media system is shown, in accordance with one embodiment of the present invention. Interactive media system 500 includes a content provider media system 520, also referred to as a content provider, and includes an on-site media system 530.

Content provider media system 520 includes a media content database 504 that provides media content data, as indicated by the arrows, to an editing block 506 and to an encoder engine block 512. Any format of data can be stored in the media content database 504. For example, in one embodiment, the media content data stored in media content database 504 is compliant with the Moving Picture Experts Group-2 (MPEG-2) standard. Media content database 504 also communicates, as shown by arrow, with on-site media service database 502, which in turn provides data to editing block 506. On-site media service database 502 includes metadata, content options, service data and service options, function data and functional options, and interactive data and interactive options, in one embodiment. However, the present invention is well-suited to storing any other type of data that would enhance the on-site media service. These data may be commands, software code, descriptive structures, or other information useful to an on-site media system. Additionally, the granularity of the on-site media service data can range from program-based to clip based, or shorter time-segments. Besides the data described, the present invention is well-suited to tying any other on-site media service data to the content data in order to provide an on-site media service that provides value to both content provider and viewer.

Editing block 506 can be thought of as the program director's editing service which takes the raw production data and formats it into a television program. The communication link between on-site media service database 502 and media content database 504 ties the on-site media service information to the core broadcast program content, e.g. a core audiovisual news program. Editing block 506 passes reference information, relating to the media content desired to be transmitted, to cutlist block 510. The service information corresponding to the desired program content to be transmitted is sent in parallel from editing block 506 to the on-site media service data block 508. The output of blocks 508 and 510 is provided in parallel with the actual content data, referenced in cutlist block 510, from media content database 504, to an encoder block 512 which subsequently provides a media signal to a user, e.g. on-site media system 530. While the present embodiment performs some editing of raw production media data, it still provides a sufficient amount of content data to a local media system to allow the viewer some options, if desired, in the selection of the content.

In one embodiment, encoder block 512 is a transmitter that provides a terrestrial broadcast of media signal 522. However, the present invention is well-suited to any means of transmitting the media signal, such as cable or satellite. The present invention is also well-suited to a wide variety of methods for encoding data for transmission to an on-site media system.

The present embodiment of content provider interactive media system shown in FIG. 5 can be implemented with hardware that includes a processor coupled to a memory for storing instructions and commands and method steps. The hardware implementation would also include a media storage device such as one or more hard drives coupled to the processor, a user input device and a transmitter, all coupled to the processor.

The other component of interactive media system 500 is on-site media system 530, which can be grouped in different sections for clarity. A first functional section 552 performs data reception in on-site media system 530. A second functional section 554 performs data recording, while a third functional section 556 performs data presentation. In data reception section 552, broadcast signal 522 is first received at a decoder functional block 532 which transmits, as shown by arrows, the decoded signal to content manager block 536. An optional information source, such as Internet data block 534, can provide additional data that can be integrated in the functional stages of on-site media system 530. Thus, for example, Internet data block 534 can automatically cache a specific Web content prior to viewer presentation in order to give the viewer a sense of instant access during the presentation. Additionally, a back channel can be enabled either via this Internet block or through other mechanisms, such as a cable modem for cable-based broadcast.

Decoder 532 can be a dedicated tuner, such as the dedicated tuner 404 shown in FIG. 4, or the dedicated tuner portion, e.g. tuner 201a of FIG. 3A. Content manager block 536 provides a filtering function on the decoded media signal. That is, content manager block 536 segregates content from on-site media service data and sends them to respective storage devices, e.g. media content hard drive 538 for content data, and on-site media service drive 540. These separate drives are figurative in one embodiment as both signals can be tied together by writing them to a single disk. Content manager block 536 can also implement a first-level content filter that, according to subscription software, user profile, or viewer-selected options, decides whether to record the media signal, e.g. to media content hard drive 538, or to ignore the signal and not record it. Content manager can be implemented using instructions stored on memory 206 and implemented on processor 204 of on-site media hardware system 200, as shown in FIG. 2, in one embodiment.

The next stage of on-site media system 530 is the data presentation formatting stage 556. In this stage, on-site media service information is received from on-site media service drive 540 at showflow engine block 544. Showflow engine block 544 formats and implements on-site media service data for subsequent integration with content data. Then showflow engine block 544 provides the processed data to rendering engine 542. Similarly, content data is received from dedicated media content hard drive 538 at rendering engine 542. Rendering engine 542 performs the formatting and integration of the desired images to be viewed on display device, in one embodiment. A wide variety of media elements, e.g. video, audio, text, etc., may be combined in many different formats to provide a desired composite presentation for viewing on display device 546. For example, electronic programming guide (EPG) information may be more dynamically formatted, including clips from the actual program. That is, the EPG can be enabled via the present invention to allow users to view previews of any program for which a commercial has been broadcast instead of the typical text title of a program in a two-dimensional grid. In another embodiment, a user program interface that presents menus, media clips, or other data, may be overlaid onto content images for display device 546.

Rendering engine 542 transfers presentation data to display device 546 for the final stage of presenting display 558. User input is communicated back to rendering engine 542 via line 548. User input can be received via push-button selection on a set-top box or a television unit, or from any other source, such as a remote control input.

While the present embodiment only shows a single decoder 532 and a single dedicated hard drive, e.g. disk set 538 and 540, dedicated for a single media signal, e.g. signal 522, the present invention is capable of functional blocks for multiple units in parallel, in one embodiment. In another embodiment, memory and processor resources (e.g. memory 206 and processor 204 of FIG. 2) are utilized to accomplish engine functions (e.g. rendering engine 542, content manager function 536, and showflow engine 544, as well as other engines not shown). It is appreciated that the engine functions performed on memory and processor are accomplished in a serial manner if only a single processor is implemented. In another embodiment, multiple processors can be utilized to accomplish dedicated functions in on-site media system 530, in a parallel or serial fashion.

Figure 6A:
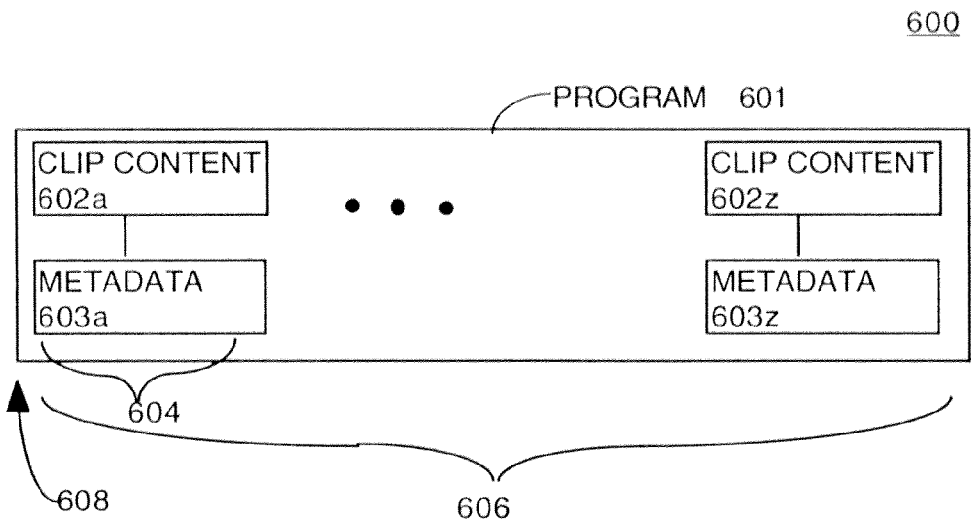
FIG. 6A is a diagram of a fine-grain media stream, in accordance with one embodiment of the present invention.

Referring now to FIG. 6A, a diagram of a fine-grain media stream 600 is shown, in accordance with one embodiment of the present invention. FIG. 6A illustrates program data and duration as a physical block 601. Program block 601 has a time span 606 over which content is presented. The present invention provides a very fine grain metadata tagging for program content. For example, FIG. 6A shows metadata labeling at a clip level, e.g. metadata tag 603a for clip content 602a having a time span of 604. This is repeated for any quantity of clips within the program. The present invention is well-suited to using any scale of metadata labeling, as appropriate for an application. For example, tagging clips with metadata would be appropriate for some news programs having many short clips in the program. By using the fine-grain metadata tagging, the present invention provides the necessary data and infrastructure for an on-site media service to provide enhanced services and functions to a viewer. One such feature would be fine-grain navigation and compilation of media content related to a specific viewer interest or inquiry.

Figure 6B:
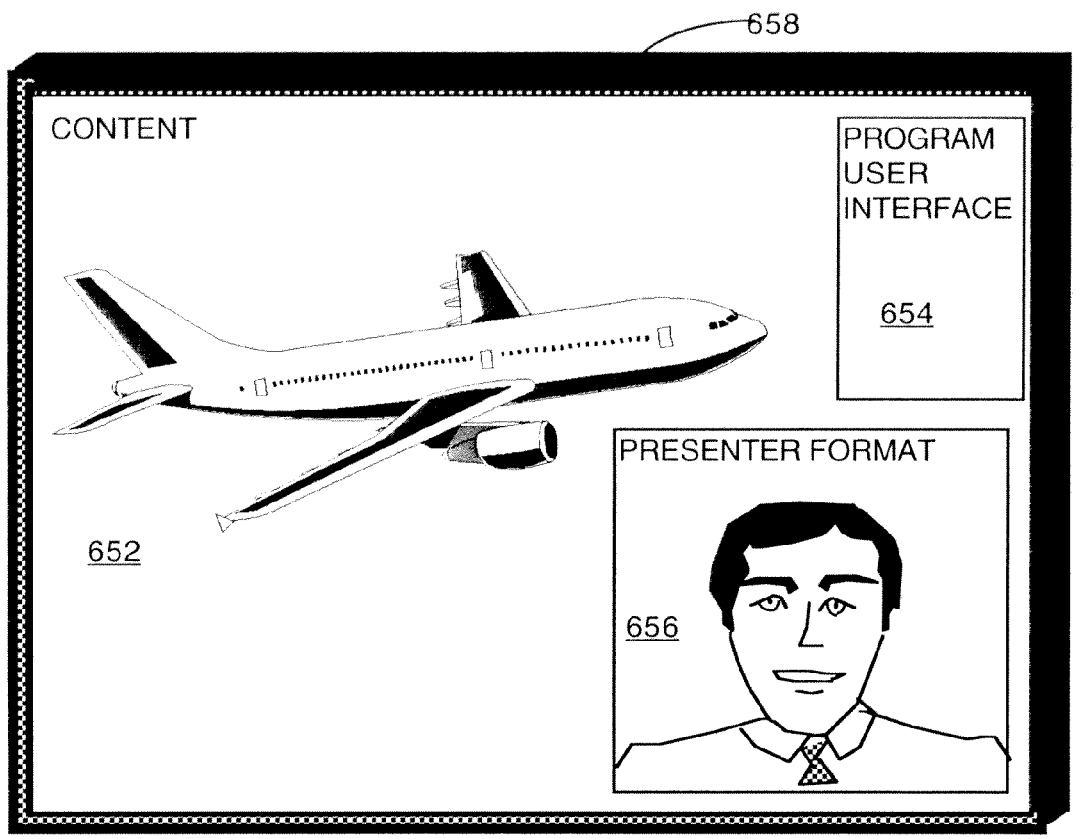
FIG. 6B is a television view generated using the interactive media system, in accordance with one embodiment of the present invention.

Referring now to FIG. 6B, a television view generated using the interactive media system is shown, in accordance with one embodiment of the present invention. Television view 650 is shown on a conventional television 658. Program user interface 654 is provided along with a presenter 656 image, both of which are overlaid onto a core media content 652, e.g., an airplane story clip. The present invention provides the appropriate audio and associated data corresponding to the video data. Notably, the content-provider can exercise editorial control over when and what service, function, and content options are available to the viewer, e.g. through the program user interface. This allows greater choice to a viewer while still satisfying a business model for the content provider.

Television view 650 illustrates how the content provider, e.g. broadcaster, can control some of the recording, management formatting, and presentation of media to a user. Similarly, television view 650 illustrates how the viewer can interact with predetermined menu options to accomplish desired services and features, e.g. viewing program user interface for alternative clips, selecting a function from a menu in program user interface 654, or adjusting the presenter format 656. The present invention is well-suited to using any combination of these, and other, presentation formats and contents to present an on-site media service to the viewer, and or user. Furthermore, each of the several on-site media services described can be implemented independent of each other, or in any combination. The same independence exists for the interactive feature of the on-site media service.

Figure 7:
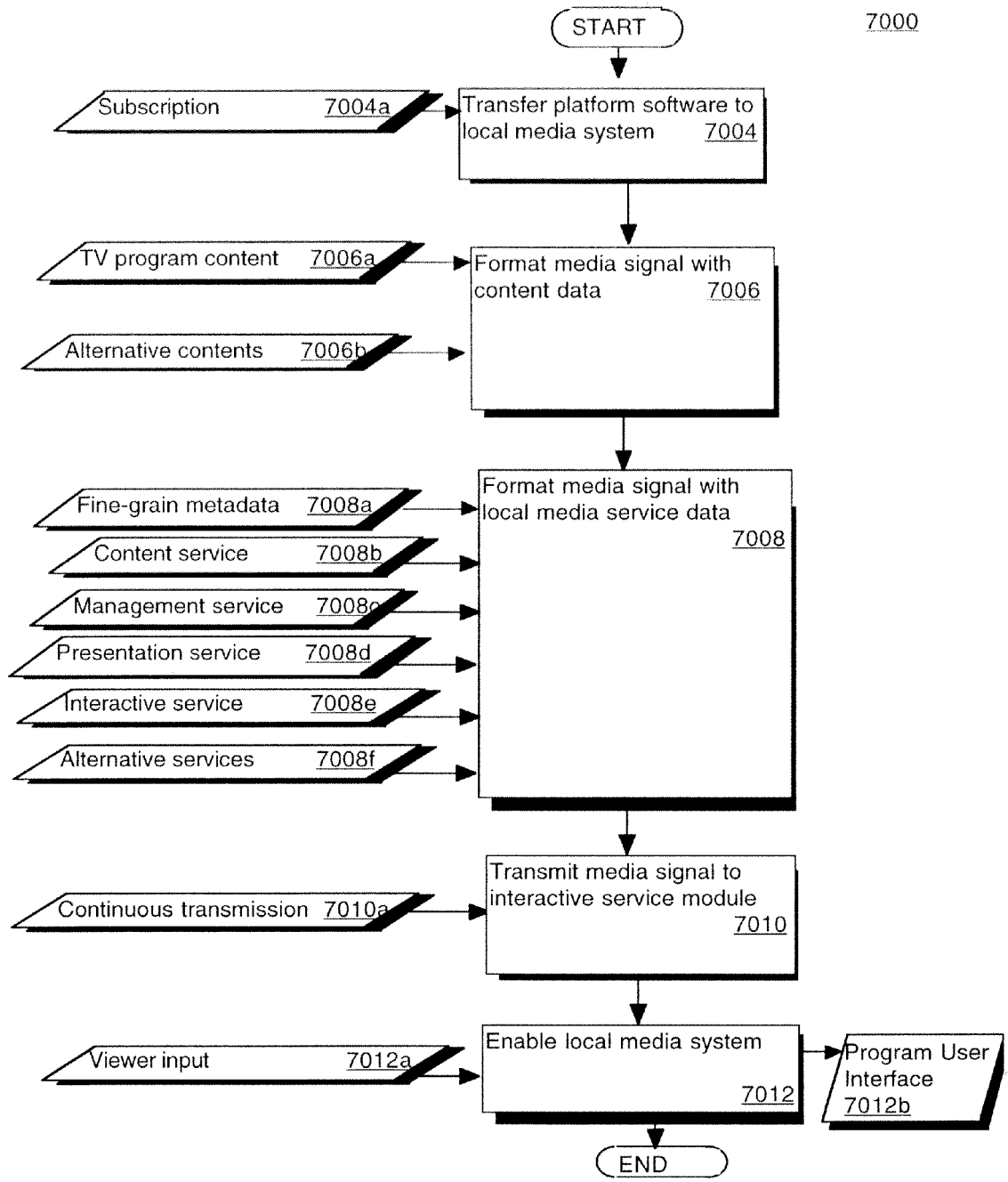
FIG. 7 is a flowchart of the process performed to provide the interactive on-site media service, in accordance with one embodiment of the present invention.

Referring now to FIG. 7, a flowchart of the process performed to provide the interactive on-site media service is shown, in accordance with one embodiment of the present invention. By using the process 7000 embodiment, the present invention can provide multiple content models of conventional broadcasts, multiple presentation formats, multiple functions and services, each of which can be interactive with a viewers needs. The resulting system is user-friendly, expandable, flexible, and it also provides a content provider with the control desired. Furthermore, the resulting system provides the viewer with the interactive features necessary to meet his/her needs.

While process 7000 embodiment of the present invention is implemented using exemplary on-site media system 200 and/or interactive media system 500, the present invention is well-suited to using a wide range of electronic devices. For example, an on-site PC with the appropriate equipment, e.g. similar to FIG. 2, may be used to implement steps applied to an on-site media system. Indeed, as TVs acquire processors and memory and as PCs acquire TV tuners cards, the two systems approach a similar configuration.

Process 7000 begins with step 7004. In step 7004 of the present embodiment, media system software is transferred to an on-site media system. Step 7004 is implemented, in one embodiment, by interactive media system 500 shown in FIG. 5. Media system software can be transmitted from content provider 520 to on-site media system 530 via media signal 522 or via Internet data 534, or some other means, such as a compact disk (CD) ROM disk. Media system software is typically provided and installed in order to enable on-site media system to perform the subsequent steps of the present embodiment process 7000. Media system software may be stored in a hard drive unit or in ROM memory, e.g. memory 206b of FIG. 2. System software can be provided in any of many different business models. For example, a subscription input 7004a from a viewer can initiate the distribution and subsequent installation of media system software. Following step 7004, process 7000 proceeds to step 7006.

In step 7006 of the present embodiment, media signal is formatted with content data. Media signal refers to the creation of a stream of information to be broadcast as a broadcast signal. Step 7006 is implemented, in one embodiment, by the exemplary device 500 shown in FIG. 5. Instead of only a conventional single linear media content format, the present invention can provide multiple content configurations, e.g. alternative contents input 7006b, subsequently available for user interactive selection. Alternative contents can provide various depths of information or content detail for a broadcast. It can also provide various types and formats of advertising for improved audience-targeting, or any other media alternatives. In this manner, the present invention provides additional utility and flexibility in meeting the viewer's media demands. The present embodiment can utilize multiple content types and formats stored in media content database 504. The multiple content types can also be formatted in a wide variety of methods for subsequent modulation, multiplexing, and transmission. While the present embodiment specifies a content format, e.g. MPEG, the present invention is well-suited to using any media content format. Following step 7006, process 7000 proceeds to step 7008.

In step 7008 of the present embodiment, the media signal is formatted with on-site media service data. Step 7008 is implemented, in one embodiment, by the exemplary device 500 shown in FIG. 5. That is, the on-site media service data is formatted according to the content provider's agenda and/or the viewers' requests. That is, the content provider, e.g. a broadcaster, may decide to provide on-site media service based on a program by program basis. In this manner, some on-site media services, e.g. navigation searches, can be provided only for a specific program and not a sitcom, e.g. a half-hour local news program, in one embodiment. Alternatively, the on-site media services can be provided as a content provider-standard for all programs, in another embodiment. Still another embodiment provides all services and allows viewer interaction to select, on a subscription basis, the desired functions. In this manner, the present invention provides added utility, value, and flexibility on a viewer-by-viewer basis. In lieu of formatting a media signal with on-site media service data, the present invention may be implemented by transmitting on-site media service data independent of the signal, e.g. similar to delivery of platform software step 7004 and providing a synchronization mechanism for linking the two signals.

On-site media services can include a wide variety of data that accomplishes a wide variety of goals. For example, inputs 7008a-7008f provide several types of on-site media service data that can be provided to on-site media system. In particular, input 7008a provides fine-grain metadata, input 7008b provides content services, input 7008c provides management services, input 7008d provides presentation services, input 7008e provides interactive services, and input 7008f provides alternative services. The content provider gains the desired control over the on-site media presentation by designing and formatting the appropriate service data, such as inputs 7008a-7008f.

Inputs 7008a-7008f are implemented, in one embodiment, by content provider function blocks 520 of FIG. 5. Specifically, the on-site media service database 502 and media content database 504, via editing block 506 provide the tied portions of content and metadata to be encoded by encoder block 512 for subsequent transmission.

Each of the inputs can allow content-provider control, or viewer interaction, on any component of the on-site media system, as desired by specific applications. For example, management service can provide services relating to the storage, archiving, and overwriting of the content in a hard drive unit. Alternatively, management services can provide a viewer with information on performance or software status for data presentation stage of on-site media system. Each of the inputs 7008a-7008f can have an interactive effect on each other. For example, different presentation service or function, such as high-resolution navigation, are only available, in one embodiment, if fine-grain metadata service is provided with a signal.

Fine-grain metadata input 7006b is tied with the content in one embodiment. The fine-grain metadata can be tied to various time spans of the content, as described in FIG. 6A. The fine-grain metadata, when stored on on-site media system 530 of FIG. 5, provides the tool for creating additional services and functions for the local viewer, such as fine-grain navigation and search services. While the present embodiments described for step 7008 or its inputs, 7008a-7008e, provide specific formats, configurations, and implementations, the present invention is well-suited to a wide variety of permutations and combinations of these items. Data provided for inputs 7008a-7008f can be command data, software application data, format data, or any other type of data useful in the on-site media presentation. Following step 7008, process 7000 proceeds to step 7010.

In step 7010 of the present embodiment, media signal is transmitted to dedicated service module, e.g. the on-site media system. Step 7010 is implemented, in one embodiment, by the functional block diagram of on-site media system 530, shown in FIG. 5. As noted in these implementations, the step of transmitting can be performed by any means, such as terrestrial broadcast, cable transmission, or satellite transmission.

Because of the control that content provider has on the on-site media system, broadcast step 7010 can be performed in a wide variety of ways. For example, individual news stories can be broadcast as they arise rather than compiling them for a given time segment broadcast from the content provider location. That is, the present embodiment can broadcast the content media of an individual news story along with the on-site media service data that allows it to be recorded at the on-site media device, regardless of whether the viewer is present or not, with tags of service information that will allow it to be formatted and presented locally, e.g. on-site with respect to the viewer. Following step 7010, process 7000 proceeds to step 7012.

In step 7012 of the present embodiment, the on-site media system is enabled by a combination of the content data, the media services data, and the platform software. Step 7012 is implemented, in one embodiment, at the exemplary on-site media system functional block 530 shown in FIG. 5. Specifically, all the functional blocks are impacted by one or more of the data or software provided. For example, Internet data block 534 may provide in-depth data from a web cache or site identified by the alternative services data, e.g. a Universal Resource Locator (URL) address, tagged to a specific media content. The retrieved data from the web page may be retained or ignored by content manager, which in turn receives instructions from content service data provided for a given user, a given program, or a given viewer interactive selection, e.g. input 7012a. From this simple example, it is clear that vast combinations and permutations of interactions between services, data, firmware, software, and hardware exist between the content provider, and the on-site content presentation engine, and the viewer. Consequently, the present invention provides a very powerful, useful, and flexible method and apparatus of providing an interactive on-site media service.

One of the outputs provided in step 7012 is the program user interface 7012b, which is implemented at the on-site media system, as shown by block 654 in FIG. 6B. The program user interface 7012 enables the user interaction with the content provider data and services. Following step 7012, process 7000 ends.

While process 7000 of the present embodiment shows a specific sequence and quantity of steps, the present invention is suitable to alternative embodiments. For example, not all the steps provided for process 7000 are required for the present invention. Furthermore, additional steps can be added to the steps presented in the present embodiment. Likewise, the sequence of the steps can be modified depending upon the application. While process 7000 is shown as a single serial process, it can also be implemented as a continuous or parallel process.

Many of the instructions for the steps, and the data input and output from the steps of process 7000 is implemented utilizing memory 206 and utilizing processor 204, as shown in FIG. 2. Memory storage 206 of the present embodiment can include both permanent memory, such as read only memory (ROM), and temporary memory such as random access memory (RAM). ROM memory can be utilized to store data for permanent functions of the dedicated service module, while RAM memory can be utilized to store data related to the on-site media service data. Memory 206 can include other types of memory storage, capable of containing data, such as a hard drive, a CD ROM, or flash memory. Furthermore, processor 204 can either be a dedicated controller, an existing system processor, or it can be a dedicated digital signal processing (DSP) processor. Alternatively, the instructions can be implemented using some form of a state machine.

The process 7000 and the hardware of FIGS. 2-6 can be implemented in many different embodiments. Several exemplary embodiments are described below to show the scope envisioned by the present invention. One embodiment of the present invention provides "video surfing" capability. Video surfing refers to enabling quick branching between related video content. Rather than developing content as a long, linear program, the content creators are interested in constructing a set of short video clips that the viewer can navigate using a structured Web-style interface. Thus, this can be supported using the earlier example of a disk in which random access is more critical than extended playback.

In another embodiment, the present invention provides "mixed media" capability. "Mixed media" refers to a variety of possibilities, ranging from alternate audio tracks, 3D animation, and content driven interaction. The alternate audio track offers targeted media experiences, such as a child announcer for a sporting event that is trying to attract younger viewers. 3D animation can be used for letting people explore features of a product, such as a car or a camcorder. Because the viewer can interact with programming, this extends naturally to media objects, such as the viewer dynamically selecting colors of a car and having them applied to an interactive 3D model.

Content providers can use this technology to offer better exposure opportunities for their sponsors, which can be enabled in a variety of ways, both spatially and temporally. For instance, in one embodiment, ads can be guaranteed delivery by using the "banner ad" approach from Web portals to avoid "surfing away". Also, very short eye-catching ads can be enabled in transitions between programs during the channel-changing process. Mixed media ads like the 3D car represent another example of ad insertion. In one embodiment, the random access media store enables the media to be delivered when appropriate to a specific, receptive viewer, rather than based strictly on the broadcast schedule.

In yet another embodiment, the services can be custom-designed in conjunction with a content providers, such as a custom news service or an a la carte sports news service. Replay capabilities can also be encapsulated in a basic dedicated service module. The news clips are indexed by the content provider and the viewer can thus start watching the news at any time. Instead of watching a linear broadcast at 6:00, the viewer can start watching at 5:55 (or any other time), and the broadcast would include a set of clips that have been updated throughout the day, with a global structure dictated by the service. The viewer can use a "SKIP" button, provided on the program user interface, to skip stories that are not of interest, and the "MORE" button, similarly provided on the program user interface, to choose associated clips that are lengthier or provide more detail. Because news stories are typically tightly regulated in time segments (e.g., 30, 60, 90 seconds), this is especially appropriate for overlaying in "story regions" of the disk. Story regions refers to short self-contained segments of media, appropriate for short news clips in one embodiment.

A similar service can be provided for sports broadcasts. This service can include multiple tuners that collect all of the action for an "action-only" view of the event. For example, bicycling enthusiasts can receive cycling-centric coverage, with a broad set of announcers, interactive 3D models of the course and bicycles, and advertisements specifically targeting bicycling enthusiasts.

In one embodiment, the dedicated service module partitions data from multiple tuners and exploits the shorter segments for efficient storage and retrieval. For example, short media segments have multiple characteristics, ranging from the program to which they belong and their place in the structure to metadata that defines their relationships with other media objects, potentially outside that program. The transient nature of the footage on finite storage with new media constantly becoming available suggests that the dedicated service module should provide efficient use of fixed-size slots. For example, typical file management schemes that use blocks to manage data can be utilized, but other paradigms can also be used to support the storage and retrieval of shorter segments.

The software architecture also offers a wide range of uses. In particular, updating capabilities via broadcast signals can be used to enhance the functionality of devices. The virtual machine in the dedicated service module can also be used to download software via broadcast signals to provide interactive software functionality.

Random access introduces both a new set of requirements and potential uses. The service-driven nature of the dedicated service module model suggests certain permutations of tuners and disks working together. Although the concept of a fixed number of hours can still be a meaningful measure of a dedicated service module, guaranteed capacity implies that there is a well-defined structure for deciding what stored media should be deleted to make room for new objects. In accordance with one embodiment, one approach is to base everything on sequence duration, which can be known a priori based on broadcast indexing. The broadcast index thus serves a variety of roles, ranging from describing the content to reconfiguring the device.

In one embodiment, there can be multiple indexing schemes. For example, an indexing scheme defined for one service can be modified for a different content provider using a different set of indexes. An example would be if extensible markup language (XML) tags were to be used to structure information, we might define different document type definitions (DTDs) for different content providers, or even for different services by the same content provider. The mechanisms for authoring, transmitting, and processing the indexes would be the same, but the different DTD would make the structure of the indexing different. For example, as it evolves, MPEG-7 technology can also be used to track and possibly incorporate in defining the structure of metadata for media.

In view of the embodiments described herein, it follows that the present invention provides a method and apparatus for on-site interactive media service. More specifically, the present invention provides an on-site dedicated media service that overcomes the limitation of a single linear content model of conventional broadcasting. Furthermore, the present invention provides an on-site dedicated media service that overcome the limitations of conventional content-only broadcasting and thereby provide greater utility to the viewer. Additionally, the present invention provides an on-site dedicated media service without the rigid limitations of the conventional linear presentation style.

The embodiments described herein also show how the present invention implements the on-site dedicated media service on an on-site media system that is much more user friendly than conventional devices. That is, the present invention provides a dedicated service module that is a self-contained autonomous "plug and play" device managed remotely by the content provider. Furthermore, the present invention provides a flexible media device that can implement new features without having to replace the device.

Furthermore, the embodiments presented herein describe, on a more specific level, how the present invention provides many other benefits, such as ensuring sponsorship exposure by providing a dedicated media service that more accurately matches advertisements with the viewer. The present invention also provides a media device that provides the viewer with more options and interactions with the media presentation they desire to view.

Furthermore, the present invention improves the ability of a viewer to locate a specific segment of information in a recorded broadcast program. The present invention also provides a media device that is simpler to use and that uses viewers' time more efficiently. The present invention accomplishes this goal by removing the management burdens from the viewer. The present invention provides a media presentation system that overcomes the limitations of conventional broadcast paradigms and of alternative media sources, such as the Internet.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
using a defined structure to automatically delete, on an on-site media system, at least a portion of stored first media content data so as to guarantee storage room for second media content data, wherein the first and second media content data are delivered via a broadcast signal for a content provider, there is a guaranteed storage on the on-site media system for media content delivered by the broadcast signal for that content provider, and the content provider is one of a plurality of content providers that each has separate guaranteed storage on the on-site media system;
receiving the second media content data from the content provider via the broadcast signal, wherein the on-site media system is remote from the content provider; and
storing the second media content data in at least a portion of the guaranteed storage room.

2. The method of claim 1, wherein using the defined structure comprises using a sequence duration.

3. The method of claim 1, wherein using the defined structure comprises using data received in a broadcast index.

4. The method of claim 1, wherein using the defined structure comprises using multiple indexing schemes, a first of the indexing schemes being defined for a first service provided by a content provider, and a second of the indexing schemes being defined for a second service provided by the content provider.

5. The method of claim 1, wherein using the defined structure comprises using multiple indexing schemes, a first of the indexing schemes being defined for a first service provider, and a second of the indexing schemes being defined for a second content provider.

6. A non-transitory machine readable medium having executable instructions to cause a processor to perform a method comprising:
using a defined structure to automatically delete, on an on-site media system, at least a portion of stored first media content data so as to guarantee storage room for second media content data, wherein the first and second media content data are delivered via a broadcast signal for a content provider and there is a guaranteed storage content on the on-site media system for media content delivered by the broadcast signal for that content provider, and the content provider is one of a plurality of content providers that each has separate guaranteed storage on the on-site media system;
receiving the second media content data from the content provider via the broadcast signal, wherein the on-site media system is remote from the content provider; and
storing the second media content data in at least a portion of the guaranteed storage room.

7. The non-transitory machine readable medium of claim 6, wherein using the defined structure comprises using a sequence duration.

8. The non-transitory machine readable medium of claim 6, wherein using the defined structure comprises using data received in a broadcast index.

9. The non-transitory machine readable medium of claim 6, wherein using the defined structure comprises using multiple indexing schemes, a first of the indexing schemes being defined for a first service provided by a content provider, and a second of the indexing schemes being defined for a second service provided by the content provider.

10. The non-transitory machine readable medium of claim 6, wherein using the defined structure comprises using multiple indexing schemes, a first of the indexing schemes being defined for a first service provider, and a second of the indexing schemes being defined for a second content provider.

11. A system comprising:
a processor;
media storage;
a memory coupled to the processor though a bus; and
a process executed from the memory by the processor to cause the processor to use a defined structure to automatically delete, from the media storage, at least a portion of stored first media content data so as to guarantee storage room for second media content data, wherein the first and second media content data are delivered via a broadcast signal for a content provider and there is a guaranteed storage on the media storage for media content delivered by the broadcast signal for that content provider, and the content provider is one of a plurality of content providers that each has separate guaranteed storage on the on-site media system, to receive the second media content data from the content provider via the broadcast signal, wherein the on-site media system is remote from the content provider, and to store the second media content data in at least a portion of the guaranteed storage room.

12. The system of claim 11, wherein using the defined structure comprises using a sequence duration.

13. The system of claim 11, wherein using the defined structure comprises using data received in a broadcast index.

14. The system of claim 11, wherein using the defined structure comprises using multiple indexing schemes, a first of the indexing schemes being defined for a first service provided by a content provider, and a second of the indexing schemes being defined for a second service provided by the content provider.

15. The system of claim 11, wherein using the defined structure comprises using multiple indexing schemes, a first of the indexing schemes being defined for a first service provider, and a second of the indexing schemes being defined for a second content provider.

16. An apparatus comprising:
means for using a defined structure to automatically delete, on an on-site media system, at least a portion of stored first media content data so as to guarantee storage room for second media content data, wherein the first and second media content data are delivered via a broadcast signal for a content provider and there is a guaranteed storage on the on-site media system for media content delivered by the broadcast signal for that content provider, and the content provider is one of a plurality of content providers that each has separate guaranteed storage on the on-site media system;

means for receiving the second media content data from the content provider via the broadcast signal, wherein the on-site media system is remote from the content provider; and means for storing the second media content data in at least a portion of the guaranteed storage room.

17. The apparatus of claim 16, wherein the means for using the defined structure includes means for using a sequence duration.

18. The apparatus of claim 16, wherein means for using the defined structure includes means for using data received in a broadcast index.

19. The apparatus of claim 16, wherein means for using the defined structure includes means for using multiple indexing schemes, a first of the indexing schemes being defined for a first service provided by a content provider, and a second of the indexing schemes being defined for a second service provided by the content provider.

20. The apparatus of claim 16, wherein the means for using the defined structure includes means for using multiple indexing schemes, a first of the indexing schemes being defined for a first service provider, and a second of the indexing schemes being defined for a second content provider.

* * * * *